Patented July 28, 1953

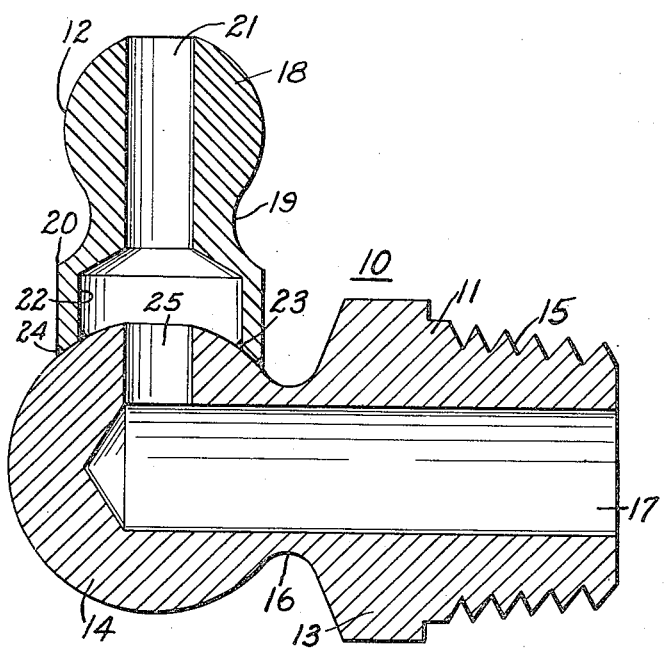

2,646,614

UNITED STATES PATENT OFFICE 2,646,614

METHOD OF MAKING LUBRICATING FITTINGS

Austin L. Staley, Fox Chapel, Pa., assignor to Universal Lubricating Systems, Inc., Oakmont, Pa., a corporation of Delaware Continuation of abandoned application Serial No. 790,375, December 8, 1947. This application August 18, 1948, Serial No. 44,883

1 Claim. (Cl. 29—157)

This invention relates to a method of making a lubricating fitting. This application is a continuation of my copending application Serial No. 790,375, filed December 8, 1947, now abandoned.

A lubricating fitting is a device applied to a mechanism requiring periodic lubrication, the fitting consisting of a body and a tip. The body is attached to the mechanism such, for example, as an automobile bearing, the attachment being effected in various ways, usually either by screwing the fitting into a drilled and tapped bore communicating with the bearing or driving the fitting into a drilled but untapped bore communicating with the bearing. In either case the fitting has a lubricant delivery passage extending through it to deliver lubricant into the bore, the opposite terminus of the lubricant delivery passage being in the tip. The tip is adapted to have the coupling of a lubricant compressor applied to it to deliver lubricant under pressure which passes through the fitting to the bore communicating with the bearing.

I have devised a method of making a lubricating fitting comprising the steps including forming a fitting body having a head at one end and a shank at the other, drilling a passage through the shank and into the head, forming a tip for said body, forming a countersink in one end of said tip, welding said one end of the tip to said head and drilling a passage through said tip and into the head intersecting said first mentioned passage.

Other details, objects and advantages of the invention will become apparent as the following description of a present preferred method of practicing the same proceeds.

In the accompanying drawing I have illustrated a present preferred method of practicing the invention in which the figure is a central section through one form of angle fitting made in accordance with my invention.

A specific way in which lubricating fittings of the angle type have heretofore been made is by turning out the fitting body comprising a base, a shank and a head from hexagonal stock on a screw machine or by cold-heading any suitable stock. The tip has been made separately on a screw machine and attached to the head or outer end of the body by screwing it into a tapped hole therein which has been drilled so as to be disposed at the desired angle. According to manual practice this requires that each fitting body, after being made on a screw machine or heading machine, be separately chucked by hand in a drill press, spot-drilled, finish-drilled and tapped. The body must then be set by hand in an assembly fixture to receive a tip from a fitting guide after which the tip is turned home by power means. A special machine set-up is thus required in the case of both drilling and assembling operations for every different angle between the axes of the tip and body. This fact and the use of hexagonal stock tend to make the cost of angle fittings quite high relative to the cost of ordinary fittings. There is a limit, furthermore, to the maximum angle obtainable between the tip and body under the practice heretofore obtaining and angle fittings have been made in only a relatively few standard angles, e. g., 30°, 45°, 60° and 90°.

My invention eliminates the costly machining operations mentioned above and makes it possible to produce fittings of both the angle type and the straight type from round stock by cold-forming operations, the only machining necessary being drilling and rolling in the base of the fitting the threads, if used, for fastening the fitting to the part to be lubricated. I may, for example, provide a piece of round stock, either solid or drilled, and cold-head the stock to form a body including a hexagonal base or nut portion for engagement by a wrench, a shank and a suitably shaped head. If solid stock is used it is drilled, after heading to provide a central passage through the body. Alternatively, the body may be made on a screw machine as heretofore from hexagonal stock. A tip is made similarly, either by cold-heading or on a screw machine, but without the usual base or nut portion or the threaded stud for screwing into the body. The body is then placed in a suitable fixture or support, the tip is bonded to the head thereof and a hole is drilled in the latter if necessary to establish communication between the passage in the tip and that in the body. The bonding may be effected by electric welding or brazing or by the use of an adhesive suitable for uniting metal parts.

The mating surfaces of the tip and body are shaped to cooperate and preferably to permit a variation in the position of the tip relative to the body. The body, for example, may have a recess or socket adapted to receive the tip and the base of the tip may be rounded so as to assume various angles with respect to the body. Conversely, the body may have a rounded or ball-shaped head and the tip a seat in its base shaped to fit thereon.

Referring now in detail to the drawing, a fitting made according to my invention, indicated generally at 10, comprises a body 11 and a tip 12. The body has a base 13 of hexagon shape, a ball head 14 and a threaded shank or stud 15. A reduced neck 16 is formed between the head and base.

The body has a longitudinal passage 17 drilled thereinto from the stud end. The tip 12 has a head 18, a neck 19 and a base 20. The head is adapted to be gripped by the jaws of a conventional coupler. The tip is drilled axially as at 21 and has its base counterbored as at 22.

As already stated, the body 11 and tip 12 may be made by cold-forming round stock in automatic machines provided with suitable dies, or the body may be made on screw machines. In the latter case, the body must be turned from hexagonal stock to provide the nut portion 13. In either case, the tip has its base shaped to afford a seat 23 conforming to the shape of the head 14. By virtue thereof, the tip may be shifted to any desired angular position relative to the body, within a wide range. When the body and tip have been assembled in the desired relation, a bond therebetween is effected, preferably by electric welding, as indicated at 24.

The welding may be carried out on any suitable machine designed for projection-welding by the electrical-resistance method. By this method, the contacting surfaces of the body and tip are heated to fusion and pressed together, thereby rendering them integral, and free from any semblance of a joint which might permit leakage. The counterbore 22 prevents flash resulting from the weld from closing the passage through the tip and keeps the flash away from the center thereof where it might interfere with the final drilling operation which is all that remains to complete the fitting. To this end, a drill is introduced through the passage 21 in the tip 12 to form a hole 25 in the head 14 of the body 11, intersecting the passage 17 therethrough. This drilling may be done as the second operation on the welding machine if a dial-type machine is employed. It will be evident that, when the tip has been attached at the desired angle, it serves as a guide for the drill which forms the bore 25 and that the latter is thus co-axial with the passage 21, whatever the position of the tip with respect to the body 11. It will be understood that the fitting may, if desired, be provided with the usual ball check valve and supporting spring in the known manner before or after the bonding of the tip to the body. In such case, the passage 17 will be counterbored to form a seat for the ball.

Before final attachment of the tip to the body, the ball head 14 and the seat 23 constitute a ball-and-socket joint permitting universal movement therebetween. As a result, the tip may be spotted in any desired location on the spherical surface of the head. Instead of welding the tip to the body, I may braze it thereto or bond it by a suitable adhesive for uniting metal parts. Several such adhesives are well known and in common use. In any event, the fitting described may be installed in the same way as angle fittings known previously, and the tip thereof disposed in the position most convenient for engagement by the coupler jaws. Free flow of grease into the bearing is permitted regardless of the angle at which the tip is disposed.

It will be apparent from the foregoing that my invention is characterized by numerous advantages over methods of making fittings known previously. In the first place, the invention makes possible the manufacture of angle fittings at a lower cost than heretofore. This results from the use of cheaper stock and the reduction in the amount of metal used, by reason of the elimination of the shank and nut of the tip. Further economy results from the reduction in the amount of machining and the substitution of simpler and quicker operations than those necessary under conventional manufacturing method. Less precision is required in both the machining and assembly, and the speed of both operations is thus increased. As an example, the final drilling after assembly of the body and tip, where necessary, is done very quickly by speed drillers chucked on the tip so that no change of fixtures is necessary for fittings having their tips at different angles.

The bonding of the tip to the body provides an integral, leakproof connection. If welding is employed, the tip becomes inseparable from the body. In any case, a permanent joint results, under all ordinary conditions.

While I have illustrated a present preferred method of practicing the invention, it is to be distinctly understood that the invention is not limited thereto but may be otherwise variously practiced within the scope of the following claim.

I claim:

In a method of making a lubricating fitting, the steps including forming a fitting body having a head at one end and a shank at the other, drilling a passage through the shank and into the head, forming a tip for said body, forming a countersink in one end of said tip, welding said one end of the tip to said head and drilling a passage through said tip and into the head intersecting said first-mentioned passage.

AUSTIN L. STALEY.

References Cited in the file of this patent

UNITED STATES PATENTS

| Number | Name | Date |
|---|---|---|
| 599,493 | Clegg | Feb. 22, 1898 |
| 982,463 | Bennett | Jan. 24, 1911 |
| 1,146,664 | Stockstrom | July 13, 1915 |
| 1,210,692 | Possons | Jan. 2, 1917 |
| 1,655,213 | Zerk | Jan. 3, 1928 |
| 1,692,320 | Zerk | Nov. 20, 1928 |
| 1,899,626 | Miller | Feb. 28, 1933 |
| 2,069,153 | Konkle | Jan. 26, 1937 |
| 2,254,503 | Thomas | Sept. 2, 1941 |
| 2,334,755 | Eglinton | Nov. 23, 1943 |
| 2,410,480 | Davis | Nov. 5, 1946 |
| 2,566,505 | Staley | Sept. 4, 1951 |

OTHER REFERENCES

Alemite Products Equipment and Parts Catalogue, issued June 1932, page 24.